United States Patent [19]

Morinaga et al.

[11] Patent Number: 5,632,781
[45] Date of Patent: May 27, 1997

[54] CATIONIC POLYCONDENSATE DYE FIXING AGENT AND PROCESS OF PREPARING THE SAME

[75] Inventors: Shinichi Morinaga, Simpsonville, S.C.; Kouji Midori, Fukui, Japan

[73] Assignees: NICCA U.S.A., Inc., Fountain Inn, S.C.; NICCA Chemical Co., Ltd, Japan

[21] Appl. No.: 315,715

[22] Filed: Sep. 30, 1994

[51] Int. Cl.$^6$ .................. D06P 5/08; D06P 1/39; D06P 3/60
[52] U.S. Cl. .................. 8/442; 8/551; 8/554; 8/495; 528/422
[58] Field of Search .................. 8/442, 554, 556, 8/495, 551, 115.6; 528/422

[56] References Cited

U.S. PATENT DOCUMENTS

| | | | |
|---|---|---|---|
| 2,649,354 | 8/1953 | Hemmi et al. | 8/74 |
| 3,232,692 | 2/1966 | Wilhelm et al. | 8/18 |
| 3,490,859 | 1/1970 | Soiron et al. | 8/74 |
| 3,873,266 | 3/1975 | Hofer et al. | 8/74 |
| 3,995,996 | 12/1976 | Pantke et al. | 8/74 |
| 4,316,005 | 2/1982 | Wurster et al. | 528/256 |
| 4,380,603 | 4/1983 | Bankert | 525/598 |
| 4,382,129 | 5/1983 | Bankert | 524/598 |
| 4,410,652 | 10/1983 | Robinson et al. | 524/195 |
| 4,439,203 | 3/1984 | Runyon et al. | 8/496 |
| 4,439,208 | 3/1984 | Moser et al. | 8/556 |
| 4,511,707 | 4/1985 | Runyon et al. | 528/250 |
| 4,548,902 | 10/1985 | Hasler et al. | 436/2 |
| 4,588,413 | 5/1986 | Keil et al. | 8/543 |
| 4,645,511 | 2/1987 | Heller et al. | 8/549 |
| 4,699,626 | 10/1987 | von Tobel et al. | 8/549 |
| 4,764,585 | 8/1988 | Heller et al. | 528/233 |
| 5,013,328 | 5/1991 | Annen et al. | 8/442 |
| 5,252,103 | 10/1993 | Kamata et al. | 8/554 |

FOREIGN PATENT DOCUMENTS

| | | |
|---|---|---|
| 0431423A2 | 12/1989 | European Pat. Off. . |
| 1047917 | 12/1953 | France . |
| 2567897 | 7/1985 | France . |
| 45-2352 | 1/1970 | Japan . |
| 48-39781 | 6/1973 | Japan . |

*Primary Examiner*—Margaret Einsmann
*Attorney, Agent, or Firm*—Bell, Seltzer, Park & Gibson, P.A.

[57] ABSTRACT

The present invention provides a cationic polycondensate dye fixing agent prepared by reacting (a) a mono- or polyfunctional amine having at least one reactive —NH or —NH$_2$ group, or a salt thereof, with (b) a polycondensate-forming cyano compound at a temperature of at least about 260° C.

The present invention also provides a process of improving the fastness of dyed materials using the cationic polycondensate dye fixing agent of the present invention.

29 Claims, No Drawings

CATIONIC POLYCONDENSATE DYE FIXING AGENT AND PROCESS OF PREPARING THE SAME

FIELD OF THE INVENTION

The present invention relates to dye fixing agents for improving the fastness of dyes applied to textile materials. More particularly, the present invention relates to cationic polycondensate dye fixing agents, and to processes for preparing the same.

BACKGROUND OF THE INVENTION

Cellulosic fibers can be easily and distinctly dyed with anionic dyes by direct dyeing processes. However generally speaking, textile materials dyed with anionic dyes by direct dyeing demonstrate very poor laundry fastness and wet fastness, and are therefore generally unsuitable for high grade fabrics. In order to improve the fastness (i.e., both laundry and wet fastness) of dyed materials, an aftertreatment chemical called a "dye fixing agent" is typically applied to the dyed material.

Dye fixing agents are of considerable interest in the art of textile coloring, and numerous dye fixing agents have been used and/or proposed in the past. One class of well known dye fixing agents employs formaldehyde as a starting material. For example, U.S. Pat. No. 3,490,859 to Soiron et al. discloses dye fixing agents based the condensation product of dicyandiamide and formaldehyde. Similarly, U.S. Pat. No. 3,995,996 to Pantke, et al., discloses dye fixing agents which include polycondensation products containing sulfonic acid groups of phenols and formaldehyde. However, the use of formaldehyde can be objectionable in the workplace and/or can require the installation of various apparatus in the workplace in order to eliminate or minimize undesirable effects believed to be associated therewith.

Cationic polycondensate dye fixing agents based on the reaction products of poly-quaternary ammonium salts, polyalkylene polyamines and dicyandiamide have also been used extensively as dye fixing agents. For example, U.S. Pat. No. 2,649,354 to Hemmi, et al. discloses dye fixing agents obtained by the condensation of an amine with a dicyandiamide. The reaction is carried out at a temperature on the order of between about 100° C. and 210° C. for several hours.

The dye fixative activity of cationic polycondensates is improved substantially by the incorporation of metal salts. Thus, Japanese Patent Publication Sho-45-2352 discloses improved dye fixing agents prepared by reacting a polyalkylene polyamine with a cyanamide or a cyanamide derivative, and a copper salt at a temperature above 100° C. and a pH above 8. Japanese Laid Open Patent Publication Sho-48-39781 discloses further improved dye fixing agents prepared by reacting a polyalkylene polyamine with dicyandiamide and a Group II metal salt, e.g., $ZnCl_2$, at a temperature of above about 150° C. The metal salt is used in an amount of about 0.5 to 20 wt. percent, based on the two components. These dye fixing agents, in particular, have achieved substantial commercial success.

More recently, U.S. Pat. No. 4,764,585 to Heller, et al. proposes dye fixing agents prepared by reacting an amine and a cyanamide in the presence of a catalyst which can be a Group II metal or metal salt, or a heterocyclic nitrogen-containing organic base, at a temperature of between 60° C. and 200° C. When a metal or metal salt catalyst is used, it is used in an amount of 0.2 to 0.48 wt. percent, based on the polyamine and dicyandiamide.

Numerous modified cationic polycondensate dye fixatives, and modified processes for their preparation or purification have also been proposed. For example, U.S. Pat. No. 3,873,266 to Hofer, et al. discloses anionic dye fixing agents comprising polyalkylene polyamine-cyanamide condensation products prepared by reacting a polyalkylene polyamine and cyanamide at a temperature of between about 107° C. and about 157° C. U.S. Pat. No. 4,410,652 to Robinson, et al. discloses dye fixing agents including the reaction products of an amine with a cyanamide, dicyandiamide, guanidine or bisguanidine which is further reacted with an N-methylol resin precursor and heat cured in the presence of an ammonia salt catalyst. U.S. Pat. No. 4,439,203 to Runyon, et al. proposes dye fixing agents including the reaction products of a mono- or polyfunctional primary or secondary amine with cyanamide, dicyandiamide, guanidine or bisguanidine and either an epihalohydrin, formaldehyde or a dihydroxyalkyleneurea. Optionally, the product may be reacted with an N-methylol derivative of urea, melamine, guanamine, triazinone, urone, carbamate or acid amide. U.S. Pat. No. 4,439,208 to Moser, et al. discloses dye fixatives formed from (1) the reaction product of an amine with a cyanamide or dicyandiamide; (2) a quaternary polyalkylene polyamine; (3) formaldehyde, and optionally, (4) an N-methylol compound, which are reacted in the presence of a metal salt catalyst, at a temperature of between about 140° C. to about 160° C.

Recent years have seen dramatically increased efforts directed to preservation of the environment on a worldwide basis. Concurrently, substantial effort has been directed to minimizing use of various volatile chemicals, such as formaldehyde, in the workplace. As a result of these and other efforts, dye fixing agents containing and/or made from materials such as formaldehyde, metals and salts thereof, and other objectionable reagents, have become increasingly expensive to manufacture and use. However, the elimination of such materials substantially reduces effectiveness of the dye fixing agents, while the substitution of other highly reactive reagents for such materials, as has been proposed in the art, can also increase the costs associated with the raw materials and the manufacturing process. Moreover, many of the highly reactive reagents, as have been proposed for use in preparing modified cationic polycondensate dye fixatives, are also objectionable.

SUMMARY OF THE INVENTION

The present invention provides cationic polycondensate dye fixing agents which avoid the use of formaldehyde and which can be prepared without the use of Group II or Transition metal or metal salt catalysts. Despite the elimination of metal and metal salt catalysts, dye fixing agents of the invention can provide improved dye fastness as compared to prior art cationic polycondensate dye fixing agents which rely on metals and metal salts to achieve commercially desirable dye fixing results.

The cationic polycondensate dye fixing agents of the invention are prepared by reacting (a) a mono- or polyfunctional amine having at least one reactive —NH or —NH$_2$ group such as a polyalkylene polyamine, or a salt thereof, with (b) a polycondensate-forming cyano compound such as dicyandiamide, at a temperature significantly higher than the temperatures previously employed in the preparation of cationic polycondensate dye fixing agents. In accordance with the invention, it has been found that at temperatures in excess of about 260° C., an improved cationic polycondensate dye fixing agent is provided even though no metal or metal salt catalyst is used to catalyze the reaction. Improved dye fixing agents of the invention exhibit superior properties, as compared to dye fixing agents prepared according to prior art processes either with or without a metal or metal salt catalyst.

Although not wishing to be bound by any particular theory, it is believed that relatively low temperature conditions have been used in the prior art to react the polyamines with cyanamides, because as the reaction temperature is increased to 250° C., the reaction mixture becomes highly viscous and essentially unworkable. The present inventors, however, have discovered that by conducting the reaction at temperatures in excess of about 260° C., the reaction mixture becomes significantly less viscous, and the product obtained imparts unexpectedly improved fastness properties to dyed materials as compared to dye fixing agents prepared at lower temperatures, and even as compared to dye fixing agents prepared in the presence of metal or metal salt catalysts.

Advantageously the process of the invention for preparing the cationic polycondensate dye fixing agent is conducted at a temperature of between about 300° C. and about 340° C. Preferably the amine is a polyalkylene polyamine and the cyano compound is selected from the group consisting of cyanamide, dicyandiamide, guanidine, and bisguanidine.

The cationic polycondensate of the present invention has a specific viscosity greater than previously known products which are prepared at lower temperatures, or with the aid of a metal or metal salt catalyst. Typically, the cationic polycondensate of the present invention has an intrinsic viscosity greater than about 0.038 dl/g.

The present invention also provides a process of improving the fastness of dyed materials by treating the dyed materials with a cationic polycondensate prepared according to the above-described process which is free of Group II and Transition metals or salts thereof. The dyed materials are typically treated with the dye fixing agent at a temperature of between about 40° C. to about 80° C. for between about 10 to about 45 minutes. Processing liquids, wastewaters and the like resulting from the dye fixing process of the invention are thus free of environmentally objectionable metals so that costs associated with metal removal can be avoided.

DETAILED DESCRIPTION OF THE PREFERRED EMBODIMENT

In the following detailed description, preferred embodiments of the invention are described to enable practice of the invention. Although specific terms are used to describe and illustrate the preferred embodiments, such terms are not intended as limitations on practice of the invention and numerous variations and modifications of the invention will be apparent to those of skill in the art. As used herein, the term "fastness" refers to both laundry and wet fastness, including fastness in hot water. The term "materials" refers to materials which are suitable for dyeing.

The cationic polycondensate dye fixing agents of the invention are particularly useful for improving the fastness of anionic dyes, especially direct dyes. These dye fixing agents are also particularly useful in connection with cellulosic fiber products including cotton, rayon, and blends thereof with various other synthetic fibers. The dye fixing agents of the invention can also be used with other materials, for example leather, and with various other dyestuffs where desirable as will be apparent to those skilled in the art.

Amines, polyamines and salt thereof used to prepare the cationic polycondensate dye fixing agent of the invention are well known in the art and include monofunctional and polyfunctional amines having one or more primary, secondary, and/or tertiary amino groups including at least one reactive —NH or —NH$_2$ group, and their mono- and poly-quaternary ammonium salts. Preferably, the organic amine is a polyfunctional amine, more preferably a polyalkylene polyamine. Preferred polyalkylene polyamines are those including at least one reactive —NH or —NH$_2$ group, and having the general formula:

$$RRN-[A-B]_n-A-NRR$$

wherein:

Each R represents the same or different moiety selected from hydrogen or a $C_{1-10}$ alkyl group which can be unsubstituted or monosubstituted with a $C_{1-4}$ alkoxy or cyano group;

n represents an integer from 0 to 100;

each A represents the same or different $C_{2-4}$ alkylene or hydroxyalkylene group; and B represents the same or different —O—, —S—, or —NR— moiety, R being defined above.

In a prefered embodiment, the polyalkylene polyamine is a polyalkyleneamine polyamine, e.g., where B is defined as —NR in the foregoing formula.

Suitable polyalkylene polyamines having the foregoing general formula are well know to those skilled in the art. Examples include but are not limited to ethylenediamine, diethylenetriamine, triethylenetetramine, propylenediamine, dipropylenetriamine, di-(hydroxypropylene)-triamines, di-(hydroxypropylene)-tetramines, and the like.

Salts of amines and polyamines, including particularly the quaternary amine and polyquaternary amine salts are also known in the art and are preferably formed by reacting the amine or polyamine with ammonium chloride. Such salts are preferably free or essentially free of any metal or metal ion thereof but can include environmentally non-objectional metals and metal ions, i.e., non-Transition Group metals such as Group I and IIa metals. Preferred salt forming reagents include aminehydrohalide salts such as ammonium chloride, and ammonium bromide. Other suitable salt forming reagents are known to those skilled in the art may also be employed in the method of the present invention.

Polycondensate-forming cyano compounds for preparing the dye fixing agents of the invention are also well known in the art and include compounds having at least one reactive cyano group therein. The preferred cyano compounds for use in the preparation the cationic polycondensate dye fixing agents of the present invention include from one to three cyano groups therein. Suitable cyano compounds include, but are not limited to, cyanamide, dicyandiamide, guanidine, and bisguanidine. Other suitable cyano compounds known to those skilled in the art may also be employed.

The reaction of the amine with the cyano compound is conducted according to the invention at temperatures of at least about 260° C. As discussed previously, at a temperature of about 250° C., the reaction mixture becomes highly viscous and essentially unworkable. The present inventors, however, have discovered that by conducting the reaction at temperatures in excess of about 260° C., the reaction mixture becomes significantly less viscous, and the product obtained imparts unexpectedly improved fastness properties to dyed materials as compared to dye fixing agents prepared at lower temperatures, and even as compared to dye fixing agents prepared in the presence of metal or metal salt catalysts.

Typically, the reaction takes place at a temperature of between about 260° C. to about 350° C. Preferably the reaction is carried at a temperature of about 260° C., more preferably at a temperature of about 270° C., and still more preferably at a temperature of about 300° C. Although temperatures in excess of 350° C. can be used in the reaction, at temperatures in excess of 350° C. discoloration of the reaction product can become problematic and such conditions are not preferred.

The cationic polycondensate of the present invention has a specific viscosity greater than previously know products which are prepared at lower temperatures, or with the aid of a metal or metal salt catalyst. Specific viscosity is calculated at 50° C. in water. The calculation is as follows:

$$\mu_{sp/c} = \frac{\eta - \eta_o}{\eta} \cdot \frac{1}{c} = \frac{t - t_o}{t_o} \cdot \frac{1}{c}$$

wherein t is efflux time of polymer solution in seconds; $t_o$ is efflux time of solvent (water) in seconds; and c is concentration (approximately 1 g/dl). The dye fixing activity of the product is believed to increase as the temperature at which the reaction takes place is increased. It is also believed that the intrinsic viscosity and molecular weight of the product increases at increasing reaction temperatures. Typically, the cationic polycondensate of the present invention has an intrinsic viscosity greater than about 0.038 dl/g.

The cationic polycondensate dye fixing agent of the present invention may be applied to dyed material to improve the fastness of the dye in what is typically termed an "aftertreatment" process. The method of improving the fastness of dyed material comprises applying the cationic polycondensate dye fixing agent of the present invention to the dyed material.

The methods of the present invention can be applied to a variety of fabrics, yarns, fibers and other textile and non-textile products. Preferably, the dye fixing agents are applied to dyed cellulosic materials including cotton, rayon, and the like, and blends thereof with other materials, including blends thereof with polyesters, copolyesters, nylons, acrylics, modacrylics and the like. Those skilled in the art will appreciate that the dye fixing agents of the present invention can advantageously be applied to other materials as well.

The cationic polycondensate dye fixing agent may be applied to the dyed material in any suitable form known to those skilled in the art. Typically, the cationic polycondensate dye fixing agent is applied as an aqueous composition comprising the cationic polycondensate prepared according to the method described above. Typically, the aqueous composition comprises between about 25 to about 75 parts by weight cationic polycondensate in water. Preferably, the aqueous composition comprises about 70 parts by weight cationic polycondensate in water.

Any suitable method of applying the cationic polycondensate dye fixing agent may be employed. Typically, the cationic polycondensate is applied to the dyed material by dipping, padding, immersing, spraying, or otherwise treating the dyed material with the cationic polycondensate. Preferably, the dyed material is immersed in a bath of an aqueous composition comprising the cationic polycondensate. Typically, about 0.5 to about 5.0 gram of dyed material per liter of aqueous composition may be immersed in the aqueous composition for aftertreatment. Preferably, the aqueous composition into which the dyed material is immersed is maintained at an elevated temperature. Typically, the temperature is between about 40° C. to about 80° C. The dyed material is typically held in the bath for between about 10 to about 45 minutes. According to one preferred embodiment, the dyed material is immersed in aqueous composition at a temperature of 60° C. for about 20 minutes.

The following examples are provided to illustrate the present invention, and should not be construed as limiting thereof. In these examples, "parts" refers to parts by weight.

EXAMPLE 1

Preparation of Cationic Polycondensate Dye Fixing Agent 82.4 Parts of diethylene triamine are heated to and between from 60° C. to 80° C., then 51.4 parts of ammonium chloride are added while stirring. Thereafter, the mixture is further heated to and maintained at between 170° C. to 200° C., and 87.4 parts of dicyandiamide are added while stirring to cause a polycondensation reaction. The reaction temperature is raised to 300° C. and held for 3 hours. During the course of the reaction, ammonia gas evolves violently. The reaction product is water soluble, and 30 parts of water are added to 70 parts of the cationic polycondensate product. The thus obtained aqueous solution is named 'Product E1' and is evaluated as a fixing agent as is.

EXAMPLE 2

Preparation of Cationic Polycondensate Dye Fixing Agent 82.4 Parts of diethylene triamine is heated to between from 60° C. to 80° C., then 51.4 parts of ammonium chloride is added with stirring. The mixture is further heated to, and maintained at between 170° C. to 200° C., then 71.5 parts of dicyandiamide is added with stirring to cause a polycondensation reaction. The reaction temperature is raised to 260° C. and held for 3 hours. During the course of the reaction, ammonia gas evolves violently. The reaction product is water soluble, and 30 parts of water are added to 70 parts of the reaction mixture. The thus obtained aqueous solution is named 'Product E2' and is evaluated as a fixing agent as is.

EXAMPLE 3

Preparation of Cationic Polycondensate Dye Fixing Agent 82.4 Parts of diethylene triamine are heated to between from 60° C. to 80° C., then 51.4 parts of ammonium chloride are added during stirring. Thereafter, the mixture is further heated, and maintained between from 170° C. to 200° C., then 87.4 parts of dicyandiamide are added with stirring to cause a polycondensation reaction. Then the reaction temperature is raised to 260° C. and held for 5 hours. During the course of the reaction, ammonia gas evolves violently. The reaction product is water soluble, and 30 parts of water are added to 70 parts of the cationic polycondensate. The thus obtained aqueous solution is named 'Product E3' and is evaluated as a fixing agent as is.

EXAMPLE 4

Preparation of Cationic Polycondensate Dye Fixing Agent 82.4 Parts diethylene triamine are heated to between from 60° C. to 80° C., then 51.4 parts of ammonium chloride are added with stirring. Thereafter, the mixture is heated to, and maintained at between from 170° C. to 200° C., then 87.4 parts of dicyandiamide are added with stirring to cause a polycondensation reaction. The reaction temperature is raised to 275° C. and held for 3 hours. During the course of the reaction, ammonia gas evolves violently. The reaction product is water soluble, and 30 parts of water are added to 70 parts of the cationic polycondensate. The thus obtained aqueous solution is named 'Product E4' and is evaluated as a fixing agent as is. Specific viscosity is determined to be 0.040 dl/g.

EXAMPLE 5

Comparative Example 82.4 Parts of diethylene triamine are heated to between from 60° C. to 80° C., then 51.4 parts of ammonium chloride are added with stirring. Thereafter, the mixture is heated to, and maintained at between from 170° C. to 200° C., then 87.4 parts of dicyandiamide are added with stirring to cause a polycondensation reaction. The reaction temperature is raised to 250° C. and maintained for as long as possible. During the course of the reaction the reaction mixture becomes a highly viscous syrup coiled around the stirrer and the experiment must be abandoned.

EXAMPLE 6

82.4 Parts of diethylene triamine are heated to between from 60° C. to 80° C., then 51.4 parts of ammonium chloride and 57 parts of ethylene glycol are added with stirring. Thereafter, the mixture is further heated to, and maintained at 100° C. Then 87.4 parts of dicyandiamide are added with stirring to cause a polycondensation reaction. The reaction temperature is raised to 195° C. and held for 3 hours. During the course of the reaction, ammonia gas evolves violently. The reaction product is water soluble, and 30 parts of water are added to 70 parts of the cationic polycondensate. The thus obtained aqueous solution is named 'Product C2' and is evaluated as a fixing agent as is.

EXAMPLE 7

Comparative Example 82.4 Parts of diethylene triamine are heated to between from 60° C. to 80° C., then 51.4 parts of ammonium chloride are added with stirring. Thereafter, the mixture is heated to, and maintained at 180° C. 21.3 Parts of cupric chloride are added with stirring. Thereafter, 87.4 parts of dicyandiamide are added with stirring to cause a polycondensation reaction. The reaction temperature is raised to 250° C. and held for 3 hours. During the course of the reaction, ammonia gas evolves violently. The reaction product is water soluble, and 30 parts of water are added to 70 parts of the cationic polycondensate. The thus obtained aqueous solution is named 'Product C3' and is evaluated as a fixing agent as is.

EXAMPLE 8

Comparative Example 82.4 Parts of diethylene triamine are heated to between from 60° C. to 80° C., and then 51.4 parts of ammonium chloride are added with stirring. Thereafter, the mixture is heated to and maintained at 180° C. Then 21.3 parts of cupric chloride are added with stirring. 87.4 Parts of dicyandiamide are added with stirring to cause a polycondensation reaction. The reaction temperature is raised to 200° C. and held for 3 hours. During the course of the reaction, ammonia gas evolves violently. The reaction product is water soluble, and 30 parts of water are added to 70 parts of the cationic polycondensate. The thus obtained aqueous solution is named 'Product C4' and is evaluated as a fixing agent as is.

EXAMPLE 9

Comparative Example 82.4 Parts of diethylene triamine are heated to between from 60° C. to 80° C., and then 51.4 parts of ammonium chloride are added with stirring. Thereafter, the mixture is heated to, and maintained at between from 140° C. to 160° C., and 21.8 parts of zinc chloride are added with stirring. Then 87.4 parts of dicyandiamide are added with stirring to cause a polycondensation reaction. The reaction temperature is raised to 250° C. and held for 3 hours. During the course of the reaction, ammonia gas evolves violently. The reaction product is water soluble, and 30 parts of water are added to 70 parts of the cationic polycondensate. The thus obtained aqueous solution is named 'Product C5' and is evaluated as a fixing agent as is. Specific viscosity is determined to be 0.036 dl/g.

EXAMPLE 10

Comparative Example 82.4 Parts of diethylene triamine are heated to a temperature of between from 60° C. to 80° C., then 51.4 parts of ammonium chloride are added with stirring. Thereafter, the mixture is heated to, and maintained at between from 140° C. to 160° C., then 21.8 parts of zinc chloride are added with stirring. Thereafter, 87.4 parts of dicyandiamide are added with stirring to cause a polycondensation reaction. Then the reaction temperature is raised to 200° C. and held for 3 hours. During the course of the reaction, ammonia gas evolves violently. The reaction product is water soluble, and 30 parts of water are added to 70 parts of the cationic polycondensate. The thus obtained aqueous solution is named 'Product C6' and is evaluated as a fixing agent as is.

EXAMPLE 11

Preparation of Dyed Textile Products

Sheets of cotton knit, which have already had sizing agents removed, been scoured and bleached, are dyed using the following dyes at 3% of the weight of the fiber for each.

a) DYRITE SUPRA BLUE BL™ 200% (C.I. Direct Blue 200)

b) DYRITE SUPRA RED BWS™ (C.I. Direct Red 243)

c) BURCO DIRECT BLACK G™ 200%

Thereafter, the sheets are washed with water and dried.

EXAMPLE 12

Treatment with Dye Fixing Agents

Each dye fixing agent is applied to each of the three kinds of dyed sheets in the amount of 2% of the weight of the fiber, using a bath ratio of 20:1, at a temperature of 60° C. for 20 minutes.

EXAMPLE 13

Laundry Fastness Tests

The laundry fastness tests are performed according to American Association of Textile Chemists and Colorists (AATCC) Test Method G1-1989, 2A. Briefly, this test entails washing the dyed and after-treated material under specified conditions and observing the effects on the dye coloration and uniformity. Each sample is rated according to specified conditions and determinants.

The results of the evaluation are shown in Table 1 below.

TABLE 1

| Product | Reaction Conditions | | | Evaluation of Fastness | | |
|---|---|---|---|---|---|---|
| | Temp. (°C.) | Time (hrs) | Catalyst | Blue | Red | Black |
| E1 | 300 | 3 | — | 4–5 | 4 | 4 |
| E2 | 260 | 3 | — | 2–3 | 3–4 | 3 |
| E3 | 260 | 5 | — | 2–3 | 3–4 | 3 |
| E4 | 275 | 3 | — | 3–4 | 4 | 3 |
| C1 | 250 | 1* | — | — | — | — |
| C2 | 195 | 3 | — | 2 | 2 | 2 |
| C3 | 250 | 3 | $CuCl_2$ | 2–3 | 3–4 | 3 |
| C4 | 200 | 3 | $CuCl_2$ | 2–3 | 3 | 3 |
| C5 | 250 | 3 | $ZnCl_2$ | 2–3 | 3 | 2–3 |
| C6 | 200 | 3 | $ZnCl_2$ | 2–3 | 2–3 | 2–3 |

TABLE 1-continued

| | Reaction Conditions | | | Evaluation of Fastness | | |
|---|---|---|---|---|---|---|
| Product | Temp. (°C.) | Time (hrs) | Catalyst | Blue | Red | Black |

*The reaction is abandoned after one hour because stirring becomes impossible due to high viscosity. No evaluation results were obtained.

As is clear from the Table, the present invention provides a superior fixing agent as compared to conventional fixing agents.

The invention has been described in considerable detail with reference to its preferred embodiments. However it will be apparent that numerous variations and modifications can be made within the spirit and scope of the invention as described in the foregoing and defined in the appended claims.

That which is claimed is:

1. A process for the preparation of a cationic polycondensate dye fixing agent for the treatment of dyed materials, said process comprising reacting (a) a polyfunctional amine having at least one reactive —NH or —NH$_2$ group with (b) ammonium halide, and then further reacting with (c) a polycondensate-forming cyano compound at a temperature of at least about 260° C.

2. The process according to claim 1, wherein said amine is a polyamine and said cyano compound is selected from the group consisting of cyanamide, dicyandiamide, guanidine, or bisguanidine.

3. The process according to claim 1, wherein said amine comprises at least one secondary, or tertiary amino group.

4. The process according to claim 3, wherein said amine is a polyfunctional amine comprising a plurality of secondary or tertiary amino groups.

5. The process according to claim 1, wherein said organic amine is a polyalkylene polyamine.

6. The process according to claim 1, wherein said cyano compound is dicyandiamide.

7. The process according to claim 1, wherein said organic amine is a polyalkylene polyamine and said cyano compound is dicyandiamide.

8. The process according to claim 1, wherein said amine is diethylene triamine and said cyano compound is dicyandiamide.

9. The process according to claim 1, wherein said further reacting step is carried out at a temperature of less than about 350° C.

10. The process according to claim 1, wherein said further reacting step is carried out at a temperature of about 260° C.

11. The process according to claim 1, wherein said further reacting step is carried out at a temperature of above about 275° C.

12. The process according to claim 1, wherein said further reacting step is carried out at a temperature of about 300° C.

13. The process according to claim 1, wherein said further reacting step is carried out in the absence of any metal or metal salt reagent.

14. A cationic polycondensate dye fixing agent produced by the process comprising reacting (a) a polyfunctional amine having at least one reactive —NH or —NH$_2$ group with (b) ammonium halide, and then further reacting with (c) a polycondensate-forming cyano compound selected from the group consisting of cyanamide, dicyandiamide, guanidine, and bisguanidine at a temperature of at least about 260° C.

15. The cationic polycondensate dye fixing agent according to claim 14, wherein said process is carried out while mixing said amine with said cyano compound to provide a reaction mixture, and said temperature is sufficiently high to provide a reaction mixture of sufficiently low viscosity to permit mixing.

16. The cationic polycondensate dye fixing agent according to claim 14, wherein said amine is a polyfunctional amine comprising a plurality of primary, secondary, or tertiary amino groups.

17. The cationic polycondensate dye fixing agent according to claim 14, having superior dye fixing properties as compared to a polycondensate prepared from the same organic amine and cyano groups in the presence of a metal or metal salt reagent.

18. The cationic polycondensate dye fixing agent according to claim 14, wherein said organic amine is a polyalkylene polyamine.

19. The cationic polycondensate dye fixing agent according to claim 14, wherein said cyano compound comprises dicyandiamide.

20. The cationic polycondensate dye fixing agent according to claim 14, wherein said organic amine is a polyalkylene polyamine and said cyano compound is dicyandiamide.

21. The cationic polycondensate dye fixing agent according to claim 14, wherein said process is carried out at a temperature of up to about 350° C.

22. The cationic polycondensate dye fixing agent according to claim 14, wherein said process is carried out at a temperature of about 260° C.

23. The cationic polycondensate dye fixing agent according to claim 14, wherein said process is carried out at a temperature of above about 275° C.

24. The cationic polycondensate dye fixing agent according to claim 14, wherein said process is carried out at a temperature of about 300° C.

25. An aqueous composition comprising the cationic polycondensate dye fixing agent of claim 15.

26. A cationic polycondensate dye fixing agent comprising a plurality of cyano moieties and a plurality of amine moieties having an intrinsic viscosity at 50° C. above about 0.038 dl/g, and being free of metal or metal salts.

27. A process of improving the fastness of a dyed material, said process comprising applying a cationic polycondensate dye fixing agent to said dyed material at a temperature of between about 40° C. to about 80° C. for about 10 to 45 minutes;

wherein said cationic polycondensate dye fixing agent is produced by the process comprising reacting (a) a polyfunctional amine having at least one reactive —NH or —NH$_2$ group with (b) ammonium halide, and then further reacting with (c) a polycondensate-forming cyano compound selected from the group consisting of cyanamide, dicyandiamide, guanidine, and bisguanidine at a temperature of at least about 260° C.

28. The process according to claim 27, wherein said step of applying cationic polycondensate dye fixing agent to said dyed material is carried out at a temperature of about 60° C. for about 20 minutes.

29. The process according to claim 27, wherein said dyed material comprises cellulosic material dyed with at least one anionic dye.

* * * * *

UNITED STATES PATENT AND TRADEMARK OFFICE
CERTIFICATE OF CORRECTION

PATENT NO. : 5,632,781
DATED : May 27, 1997
INVENTOR(S) : Morinaga et al.

It is certified that error appears in the above-indentified patent and that said Letters Patent is hereby corrected as shown below:

Col. 7, line 8, after "EXAMPLE 6" insert sub-heading --Comparative Example--.

Signed and Sealed this

Eighteenth Day of November 1997

Attest:

BRUCE LEHMAN

Attesting Officer

Commissioner of Patents and Trademarks